(12) United States Patent
Dos Reis Alipio da Cruz

(10) Patent No.: US 9,921,572 B2
(45) Date of Patent: Mar. 20, 2018

(54) SPRINGBACK COMPENSATION IN FORMED SHEET METAL PARTS

(71) Applicant: Embraer S.A., Sao Jose dos Campos-SP (BR)

(72) Inventor: Olavo Dos Reis Alipio da Cruz, Sao Jose dos Campos (BR)

(73) Assignee: Embraer S.A., São José dos Campos (BR)

( * ) Notice: Subject to any disclaimer, the term of this patent is extended or adjusted under 35 U.S.C. 154(b) by 542 days.

(21) Appl. No.: 14/106,174

(22) Filed: Dec. 13, 2013

(65) Prior Publication Data

US 2015/0134093 A1      May 14, 2015

Related U.S. Application Data

(60) Provisional application No. 61/903,374, filed on Nov. 12, 2013.

(51) Int. Cl.
| | | |
|---|---|---|
| *G05B 19/409* | (2006.01) | |
| *G05B 19/4097* | (2006.01) | |
| *G06F 17/50* | (2006.01) | |

(52) U.S. Cl.
CPC ..... *G05B 19/4097* (2013.01); *G06F 17/5018* (2013.01); *G06F 17/5095* (2013.01); *G05B 2219/35017* (2013.01); *G06F 2217/42* (2013.01)

(58) Field of Classification Search
CPC ............ G05B 19/4097; G06F 17/5018; G06F 17/5095; G06F 2217/42

USPC .......................................................... 700/97
See application file for complete search history.

(56) References Cited

U.S. PATENT DOCUMENTS

| | | |
|---|---|---|
| 4,802,357 A | 2/1989 | Jones |
| 5,546,784 A | 8/1996 | Haas et al. |
| 6,947,809 B2 | 9/2005 | Ren et al. |
| 7,130,714 B1 | 10/2006 | Kulkarni et al. |
| 8,046,098 B2 | 10/2011 | Paik |
| 2004/0073323 A1* | 4/2004 | Zhu ................ G05B 19/404 700/31 |

OTHER PUBLICATIONS

R. Lingbeek, J. Huetink, S. Ohnimusb, M. Petzoldt, J. Weiher. The development of a finite elements based springback compensation tool for sheet metal products. Journal of Materials Processing Technology 169 (2005) 115-125.*

(Continued)

*Primary Examiner* — Robert Fennema
*Assistant Examiner* — Shon Foley
(74) *Attorney, Agent, or Firm* — Nixon & Vanderhye P.C.

(57) ABSTRACT

Finite element methods for compensating for springback in aircraft parts meet the visual appearance and aerodynamics of complex parts including those made of fabricated sheet metal. The methods can be used to make narrow parts (e.g., leading edge and slats) and double negative curvature parts, and do not need to leave marks on the surface of the sheet so that visual aspects are not adversely affected. The point to point compensation technique uses approach equations with constants adjustable for curves. The constant(s) used depend on geometry and type of forming (e.g., stretch or hydraulic press). Use of mechanical properties of the material is not required.

24 Claims, 8 Drawing Sheets

(56) References Cited

OTHER PUBLICATIONS

R. A. Lingbeek, W. Gan, R. H. Wagoner, T. Meinders, J. Weiher. Theoretical verification of the displacement adjustment and springforward algorithms for springback compensation. Int J Mater Form (2008) 1:159-168.*

X.A. Yang, F.Ruan. A die design method for springback compensation based on displacement adjustment. International Journal of Mechanical Sciences 53 (2011) 399-406.*

Wei Gan, R.H. Wagoner. Die design method for sheet springback. International Journal of Mechanical Sciences 46 (2004) 1097-1113.*

European Aluminium Association. The Aluminium Automotive Manual. 2011. http://european-aluminium.eu/media/1510/aam-design-4-design-for-cost-optimization.pdf.*

John Burkardt. Meshing for the Finite Element Method [online]. Department of Scientific Computing Florida State University, Nov. 4, 2011 [retrived on Jan. 19, 2017]. Retrieved from the Internet<URL: https://people.sc.fsu.edu/~jburkardt/classes/fem_2011/fem_meshing.pdf >.*

Paunoiu, Viorel, et al., "Spring back Compensation in Reconfigurable Multipoint Forming," Proceedings of the 8th WSEAS International Conference on System Science and Simulation in Engineering, 2009, pp. 180-185.

ACB, Sheet Stretch Forming, https://www.acb-ps.com/en/products/sheet-stretch-forming, retrieved May 16, 2017, 4 pages.

* cited by examiner

■ dz/dx = 0 , maximum point
♦ dz/dx = 0 , minimum point
• dz/dx ≠ 0

SPRINGBACK COMPENSATION IN FORMED SHEET METAL PARTS

CROSS-REFERENCE TO RELATED APPLICATIONS

This application claims the benefit of U.S. Provisional Patent Application No. 61/903,374 filed Nov. 12, 2013, which is incorporated by reference.

STATEMENT REGARDING FEDERALLY SPONSORED RESEARCH OR DEVELOPMENT

None.

FIELD

The technology herein relates to calculation of springback and compensation of assembly parts and more particularly to curved surfaces applied in sheet metal parts. The technology herein further relates to such calculations using interpolation and finite elements techniques, and to computing systems and methods for performing such calculations in order to manufacture parts including but not limited to sheet metal aircraft parts.

BACKGROUND AND SUMMARY

Normally the skins of the outer surfaces of the aircraft are manufactured by stretching. Forming machine parts must often meet aerodynamic requirements and visual aspects.

A major problem is spring back in parts such as leading edges and parts having double negative curvature (e.g., using bulldozer parts). See for example Maker et al, A Procedure for Springback Analysis Using LS-DYNA (Livermore Software Technology Corp. 2003), incorporated herein by reference.

To minimize residual stresses and deformations, prior techniques divided such parts into two pieces, which increased weight and cost and also affected visual appearance.

Spring back compensation has in the past been performed using a stretch machine, but many parts are now manufactured using a conventional fluid cell press that does not necessarily provide the same opportunities to assess spring back and perform spring back compensation as a stretch forming machine.

The use of springback compensation on curved surfaces (sheet metal) using the technique of finite element analysis minimizes the costs, the residual stresses and deformations in riveted structures of the aircraft.

The technology herein meets the visual appearance and aerodynamics of complex parts including those made of fabricated sheet metal.

It can be used to make narrow parts (e.g., leading edge and slats) and double negative curvature parts, and does not need to leave marks on the surface of the sheet so that visual aspects are not adversely affected.

The compensation technique, point to point uses approach equations with constant adjustability for curves. The constants (coefficients) used may depend on geometry and type of forming (stretch or hydraulic press). This example non-limiting process does not need to use mechanical properties of the material.

The technology herein can use compensated tooling of any type, irrespective of the method used for forming (stretching or pressing), processed at room temperature or heated for aluminum alloys.

BRIEF DESCRIPTION OF THE DRAWINGS

These and other features and advantages will be better and more completely understood by referring to the following detailed description of example non-limiting illustrative embodiments in conjunction with the drawings of which.

DETAILED DESCRIPTION OF NON-LIMITING EMBODIMENTS

Generally speaking, the finite element method (FEM) is a numerical technique for finding approximate solutions to boundary value problems for differential equations. It uses variational methods (the calculus of variations) to minimize an error function and produce a stable solution. Analogous to the idea that connecting many tiny straight lines can approximate a larger circle, FEM encompasses all the methods for connecting many simple element equations over many small subdomains, named finite elements, to approximate a more complex equation over a larger domain. See e.g., Wikipedia article "Finite element method" (2013) and Liu, "The Finite Element Method Second Edition A Practical Course (Elsevier 2013), incorporated herein by reference.

Spring back compensation on curved surfaces (e.g., sheet metal) using the finite element iterative technique can be used to minimize.

a) Costs b) Residual Stresses and Deformations in Riveted Structures.

The spring back in sheet metal parts is generally speaking:

a) Inversely proportional to the thickness of the sheet metal, and b) Directly proportional to the angle between the force and the surface of the sheet metal.

Figure 10:
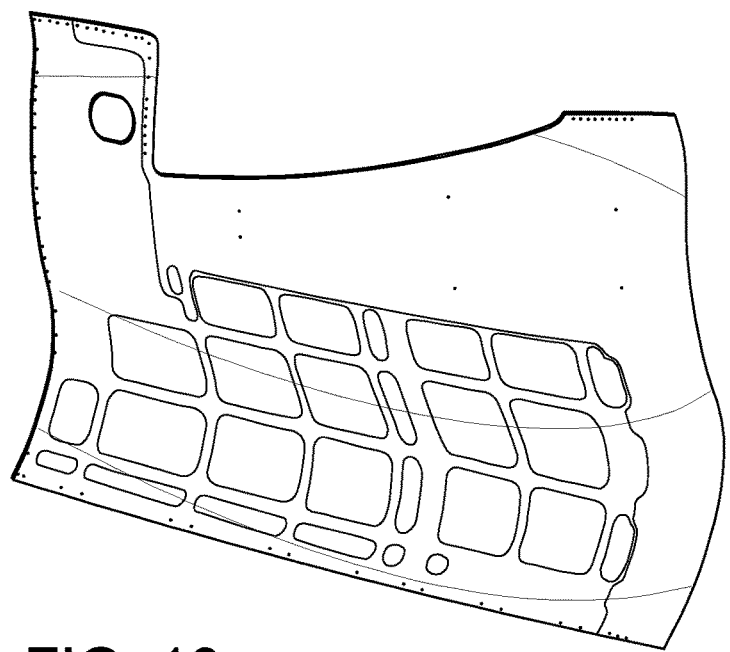
FIG. 10 shows an example of the double negative curve.
Figure 11:
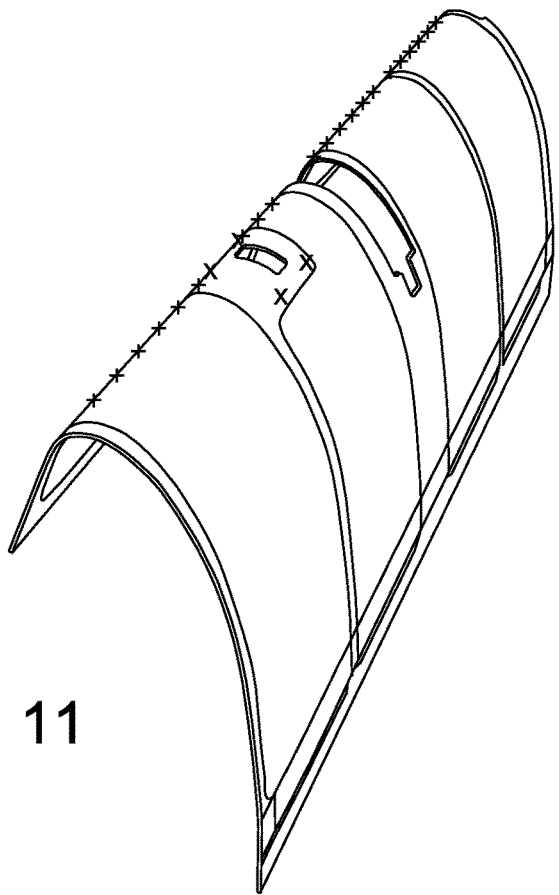
FIG. 11 shows an example of the narrow parts (leading edge)

Example sheet metal parts that present significant spring-back are narrow surface and double negative curve parts, such as shown in FIG. 10 (double negative curve) and FIG. 11 (narrow surface-leading edge), respectively. In aircraft, these parts normally have aerodynamics and visual appearance requirements.

Figure 12:
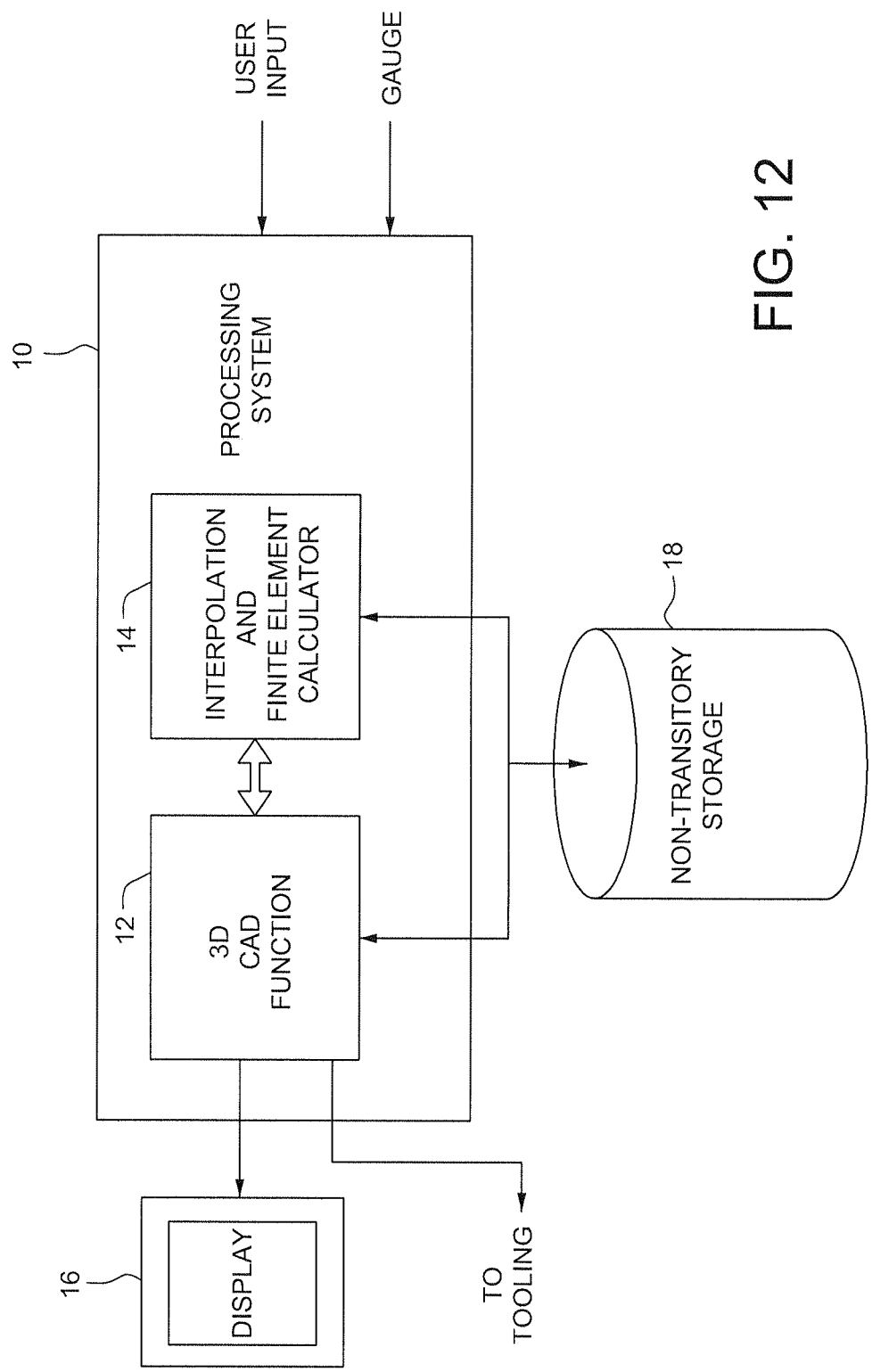
FIG. 12 shows an example non-limiting computing device for implementing the technology herein.

An example non-limiting process is performed using Catia V5 3D Computer Aided Design (CAD) software available from Dassault Systemes and Microsoft Excel spreadsheet software, but other implementations using the example computing system of FIG. 12 are also possible.

Figure 9:
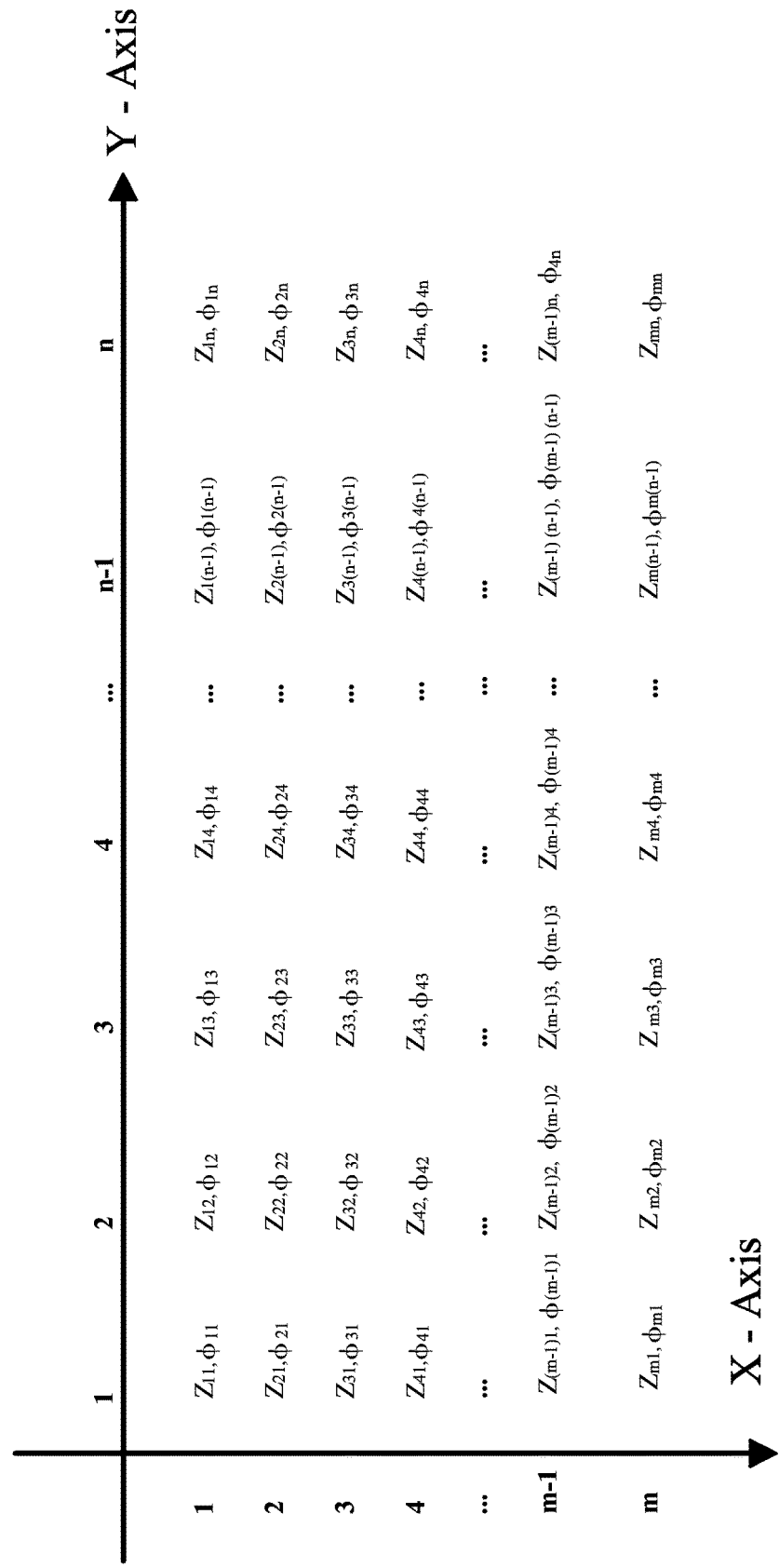
FIG. 9 is an example of a generic non-limiting spreadsheet or calculation matrix used in an example non-limiting calculation.

FIG. 9 is a generic non-limiting spreadsheet generated by electronics (e.g., the system of FIG. 12) of data obtained from the CATIA V5 CAD software for an example part design. For example, the non-limiting spreadsheet can comprise an interpolation and finite element calculator 14, which in turn can comprise software instructions stored in non-transitory memory 18 and executed by a processing system 10. Similarly, the 3D CAD function 12 can be provided by software instructions stored in non-transitory memory 18 and executed by the same or different processing system 10. The 3D CAD system can display information on a display 16 in response to user input and/or input from sensors or other data gathering devices used to gather (measure) information about the configuration and/or springback of parts. Processing system 10 can output data to stretch forming and/or press forming machines such as for example a conventional fluid cell press used to manufacture parts for testing and ultimately for use.

The example embodiments herein have been made in an effort to solve the problems of spring back which occurs in certain types of curved sheet metal parts, using techniques of interpolation and finite element analysis.

The example non-limiting calculation does not utilize mechanical properties, but at the initial position (x, y, z, φ) and the final position (x, y, z") of the part. The process is kept constant and the mechanical properties are condensed in the constants in the equations of interpolation.

Technical Solution

Example Compensation for double negative curvature.

The surface is divided into small elements (with perpendicular lines) in reference to the coordinate system XYZ arbitrary, see FIGS. 3 and 4 and FIGS. 5 & 6.

By definition in this non-limiting example, the X axis is the one with the greatest curvature, so that the angles are measured from the surface in this axis.

Thus the starting coordinates are set (x,y,z,φ) relative at point (0,0,0) of the arbitrary cartesian coordinate system (XYZ).

Figure 5:
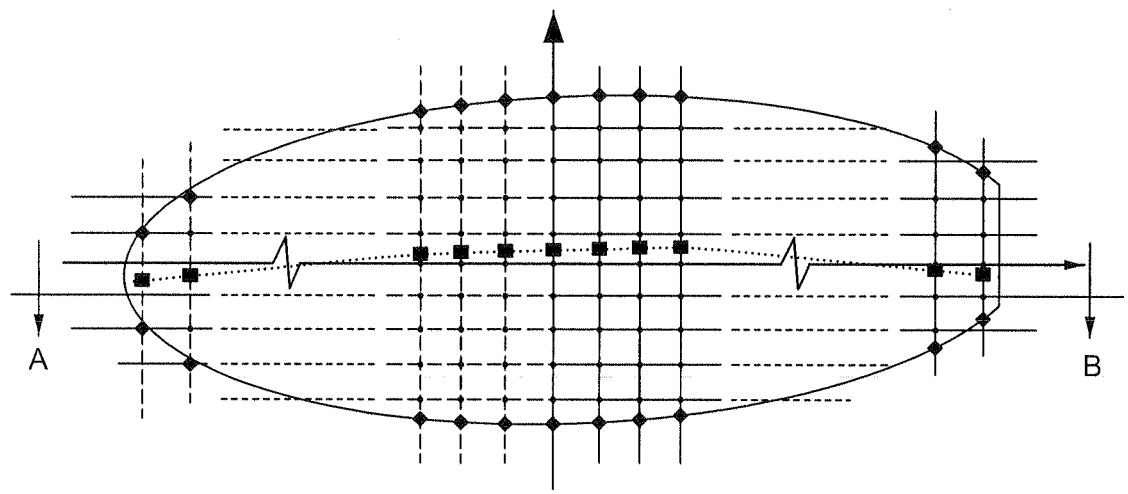
FIG. 5 is an illustration of a top representation of points within the area of compensation of springback and FIG. 6 shows a cross section of the FIG. 5 example structure taken along AB.
Figure 6:
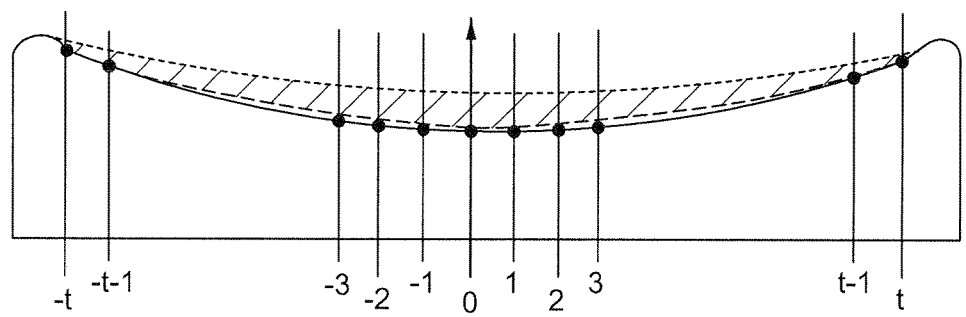

In the example shown, the compensation is performed only within the curve, see FIGS. 5 & 6.

In one example non-limiting implementation, the Z height compensation is calculated in 3 phases:

1° Step

Figure 3:
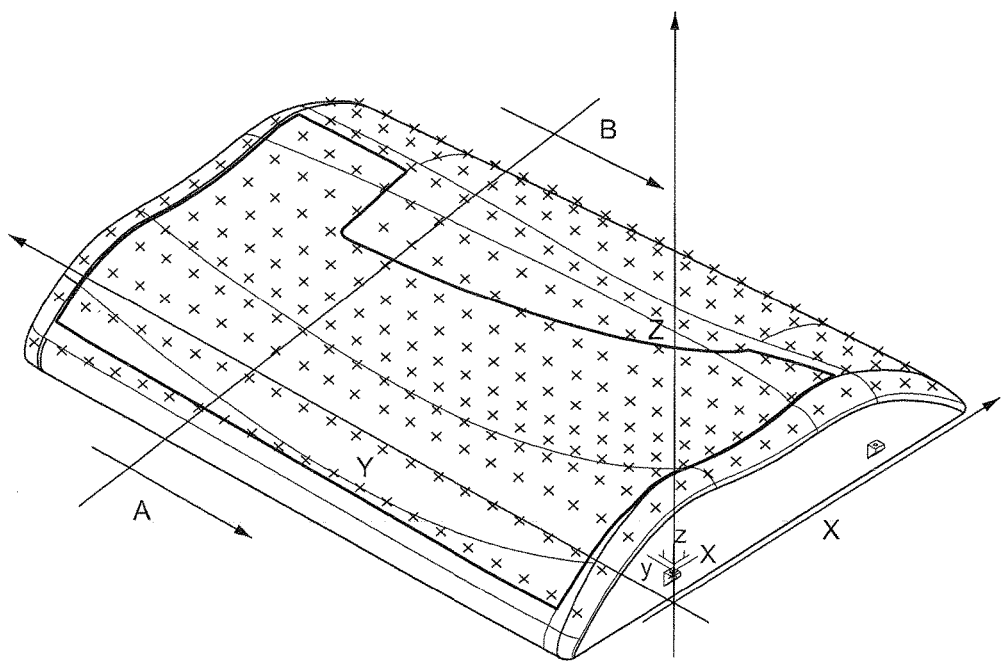
FIG. 3 is a schematic drawings of compensation of example non-limiting parts with double negative curvature.

First in relation to the X axis and the φ angle by equation 1:

The calculation is done column by column, as shown in FIG. 3.

i=1 to m, after j=1 to n, according generic spreadsheet, FIG. 9.

$$Z'_{ij} = (k_0 k_1 \times (\text{sen}\varphi_{ij})^s)) \quad (1)$$

where:

$K_0$=main constant (maximum value to be compensated in mm)

$K_1$=secondary constant (curve displacement).

s=smoothing curve.

Example range of values used in the constant (reference):

$k_0$=2 to 10 mm.

$k_1$=20 to 50.

s=0.1 to 0.9

2° Step

Then, in relation to the Y axis as follows and FIGS. 5 & 6:

The referential is changed to the column "X" of the greater springback, in this case the middle of the tooling, see FIGS. 5 & 6.

$\Delta Z_{ij}$=maximum value to be compensated in the line segment yx in mm.

t=number of intervals between the points Z' on each line xy.

$$Z''_{ij} = Z'_{ij} - \sum_{j=1}^{j=t} (\Delta Z_{ij}/t) \times j \quad (2)$$

$$J = (1, 2 \ldots t_{-1}, t),$$

The calculation of Z" is done to the right and the left of the referential, see FIGS. 5 & 6.

3° Step

Points with derivative dz/dx=0

The maximum points (dz/dx=0) that aren't compensated shall be the limit points.

The coordinates 'X' points (dz/dx=0) do not usually match the coordinates of the XY grid.

The minimum points (dz/dx=0), are compensated according to step 2.

Once the "cloud" of points Z" are derived, the system of FIG. 12 generates the "compensated solid" and data defining the machining tooling. In the example non-limiting implementation, the process is iterative until the desired line system and resolution is obtained.

Example Compensation of Narrow Surfaces: Leading Edge and Slat

The surface is divided into lines which depend on the distances derived (dz/dy) and the distance "X" (variable) depends on the derivatives (dz/dx). The angle is defined in the direction "x" measured from the surface.

Figure 7:
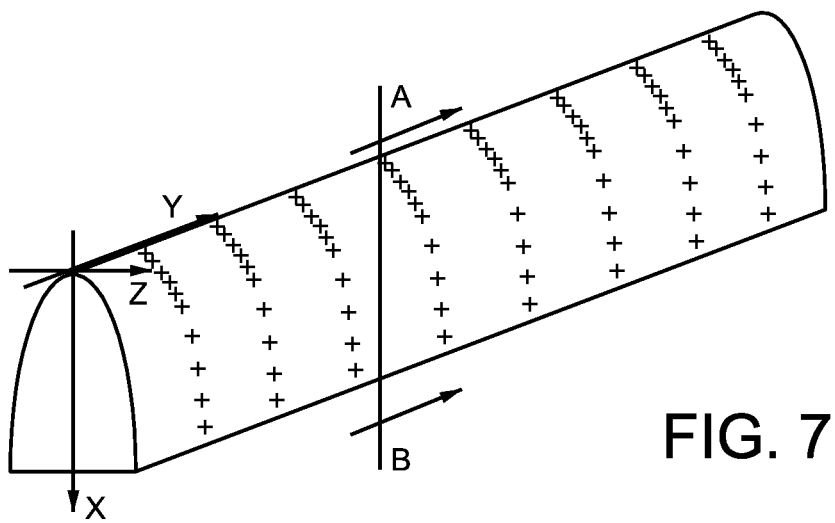
FIG. 7 is a schematic drawing of a top view of example non-limiting compensation for narrow part leading edges and slats.
Figure 8:
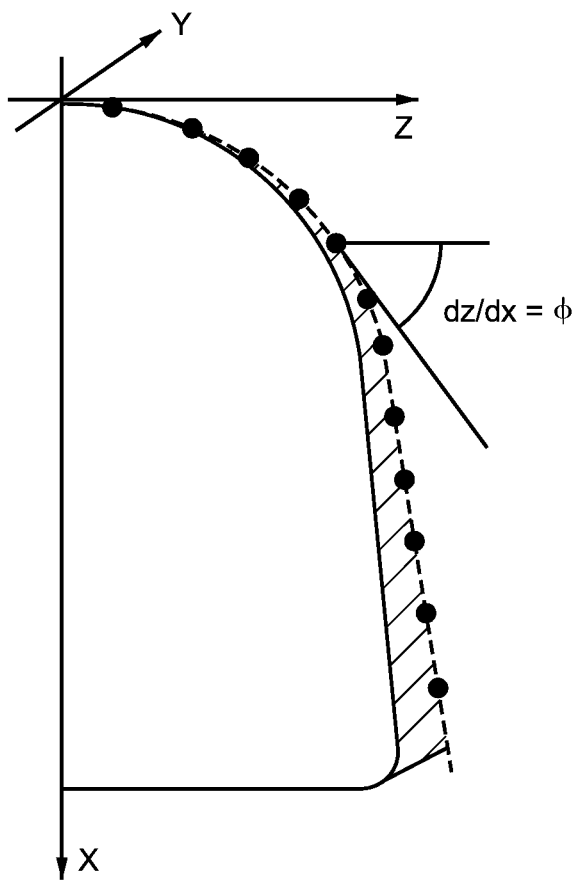
FIG. 8 shows a cross-section taken along AB of the FIG. 7 example structure. The distance between the curves can vary from 10 to 100 mm in the same tooling. The distance between points of the same curve can vary from 2 to 20 mm.

Z' is determined by the equation below:

The calculation is done column by column, as shown in FIGS. 7 & 8.

i=1 to m, after j=1 to n, according generic spreadsheet, FIG. 9.

$$Z'_{ij} = Z_{ij}(k_0 \times (\text{sen}\varphi_{ij})^s) \quad (3)$$

where:
$K_0$=maximum value to be compensated in mm.
s=smoothing curve.
Example range of values used in the constant (reference):
$k_0$=1 to 20 mm.
s=10 to 50

Once the "cloud" of points Z' are derived, the example non-limiting system of FIG. 12 generates the "compensated solid" and machine tooling parameters to manufacture a test part. The process may be iterative until the desired line system is attained.

Example Non-Limiting Flowchart Description

Figure 1:
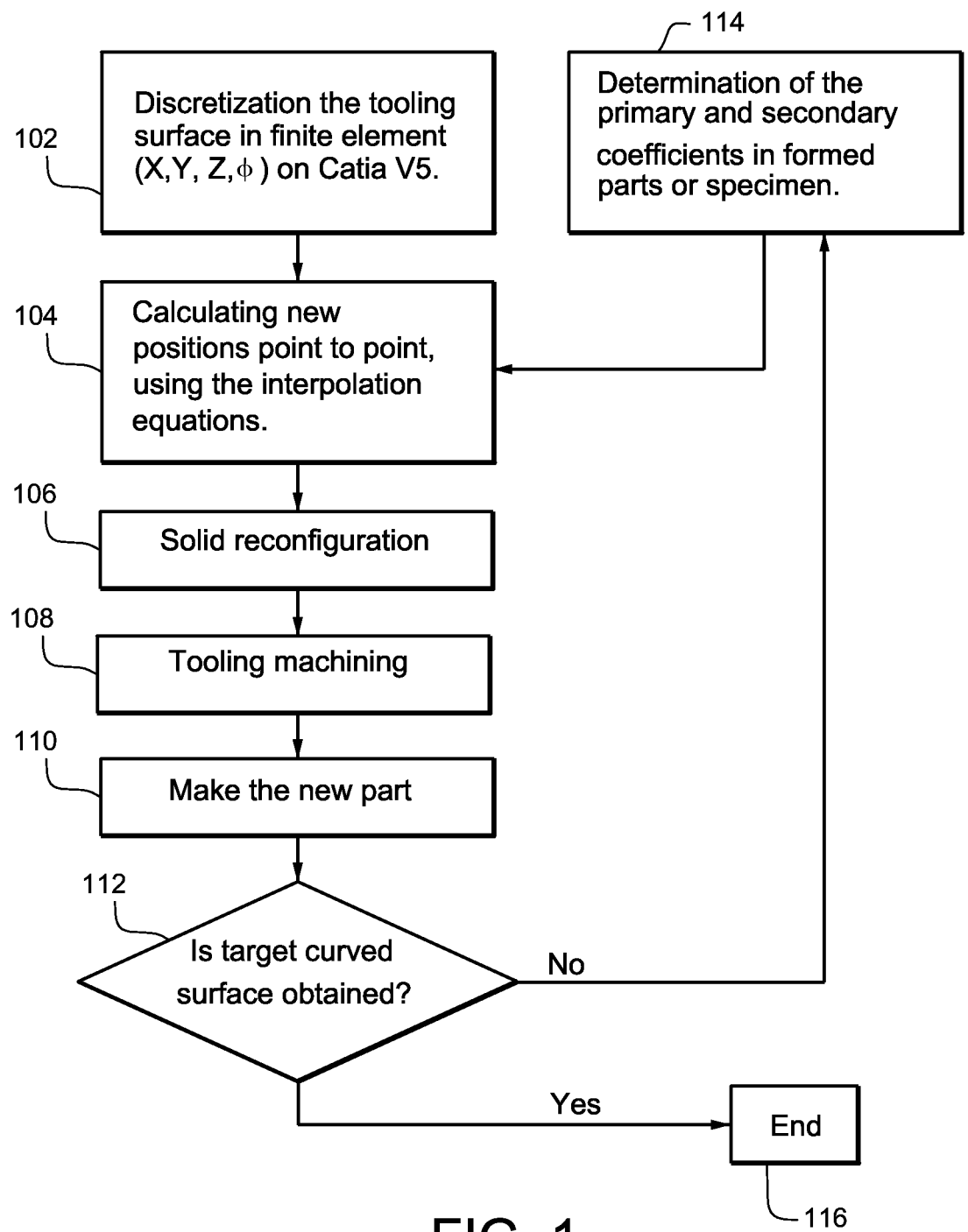
FIG. 1 is an illustration of example non-limiting process flow for forming a curved surface of a metal sheet when the constants (coefficients) of the interpolation process (equation of interpolation) are not known. In this case, it is useful to make the tooling and compensate for stretch after the test parts are made.

FIG. 1—Tooling and parts are available.

a) Through the project of the tooling in CATIA V5 and coordinated predetermined reference ($x_0$, $y_0$, $z_0$), the mesh on the surface the tooling is generated (102). The mesh size can vary depending on the surface of the tooling. Also is generated the angle, point by point with reference to base plane of the tooling. After that the data can be exported to Excel or other software through a macro from Catia V5.

b) Calculation equations (104) depend on the type of geometry (double negative curvature surfaces or narrow surfaces for example).

In one example implementation, the primary coefficient is determined by measuring the gap between tooling and part (on the point of greatest deflection), with an accuracy of 0.1 mm using a caliper rule or feeler gauge. Such measured parameters can be manually input to system 10, or the caliper rule or feeler gauge device can automatically measure the gap between tooling and part on the point of greatest deflection and provide a signal that is automatically provided to system 10.

The other coefficients are fine tuning of the curves.

Figure 4:
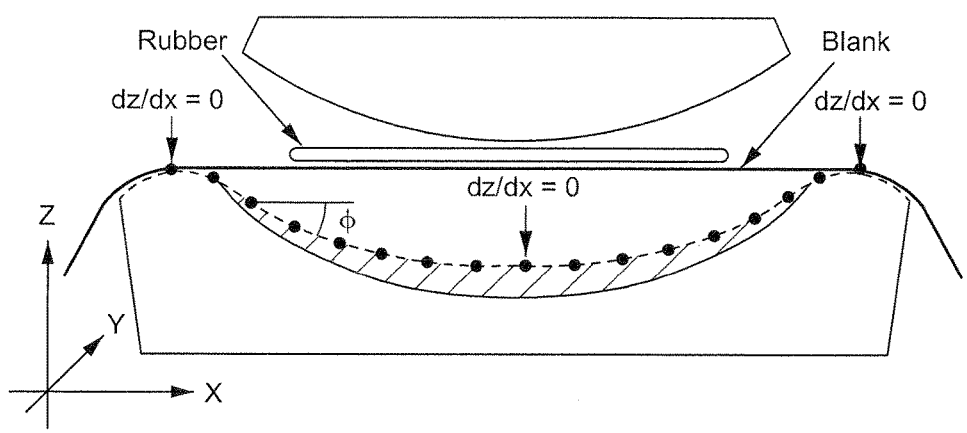
FIG. 4 shows a cross-section of the example double negative curvature structure of FIG. 3 taken along AB. The distance between lines (mesh) of FIG. 3 depends on the derivatives (dz/dx) and (dz/dy), that is, inversely proportional to these values. Typically, the mesh size can range from 10 mm to 50 mm and can have different dimensions within the same of tooling.

When calculating the double negative surface system 10 can use Equation 1, following Equation 2, as shown in FIGS. 3 and 4.

When calculating the narrow surface system 10 uses the equation 3, as shown in FIGS. 5 & 6.

c) Solid Reconfiguration

After determined all new points, system 10 rebuilds the solid again in Catia V5 (block 106).

d) Tooling Machining

After generation of the new solid, system 10 outputs parameters used to define the machining of the part (block 108).

e) Makes the New Part

Makes (manufactures) the new part for try out, the manufacturing being based on the new solid data (block 110).

f) Inspection (Block 112)

If the part is not good, repeat the procedure with the new more refined data (block 114).

If the part is good, archive the data in the database (block 116).

Figure 2:
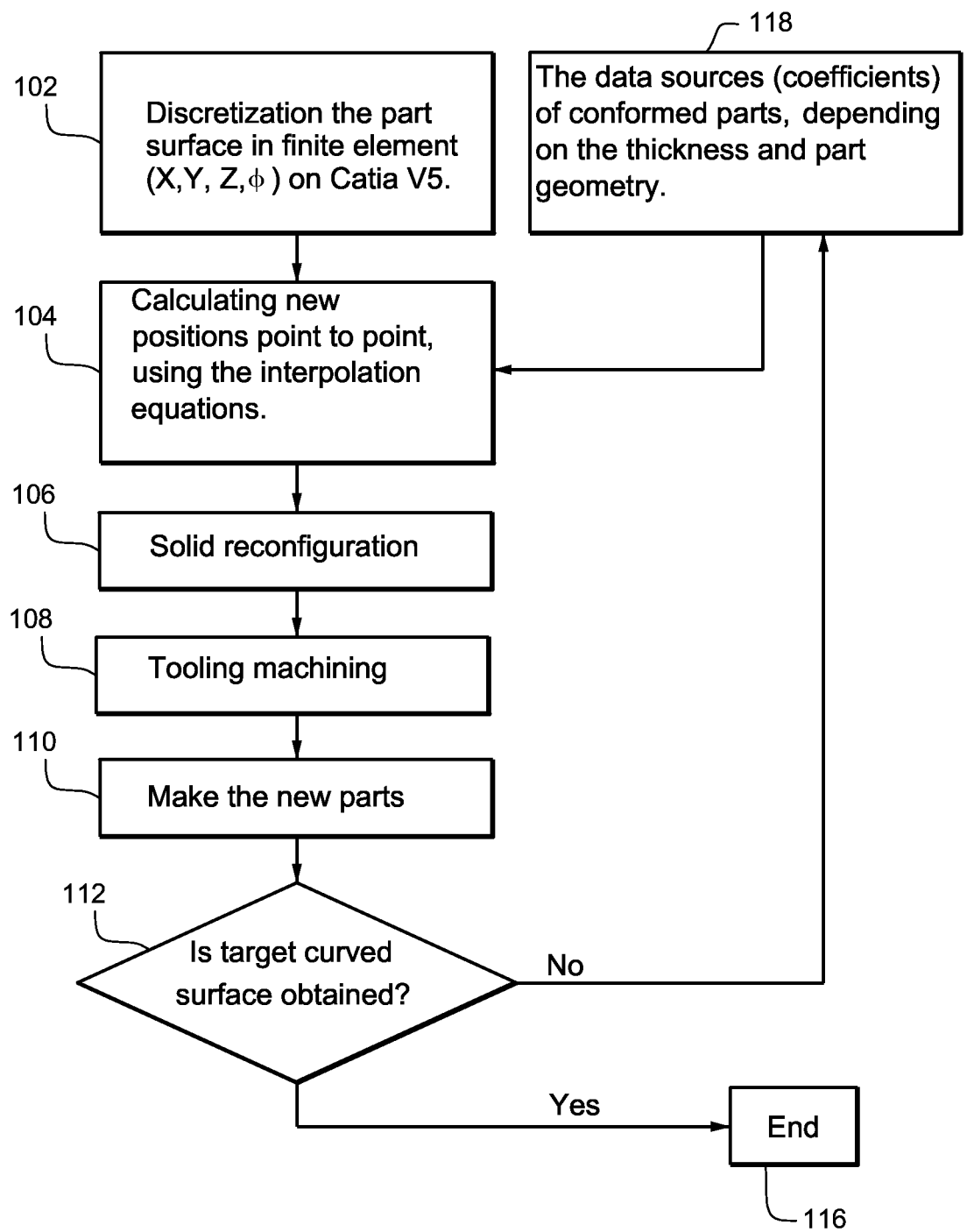
FIG. 2 is an illustration of an example non-limiting flowchart illustrating a curved surface forming method for a metal sheet, when there is prior knowledge of the values of the constants (coefficients) of the interpolation equations.

FIG. 2—An example flowchart of a process where the part design is available and the coefficients of the equation of interpolation are known.

When a database with similar parts and defined process is already available, we can estimate the constants of the interpolation.

Calculation steps are the same as in FIG. 1 and see the calculation steps above. However, in this example process, block 114 is replaced by use of the data sources (coefficients) of conformed parts, depending on the thickness and geometry of the parts (block 118).

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of manufacturing a part comprising:
using at least one processor, discretizing a tooling surface using a finite element analysis to determine initial coordinates ($x_0$, $y_0$, $z_0$) wherein $x_0$, $y_0$, $z_0$ represent initial three-dimensional position;
using the at least one processor, compensating for springback by calculating new coordinates ($x_1$, $y_1$, $z_1$,φ) for the tooling surface point-to-point using interpolation equations that depend on the type of machining to be used to reconfigure and machine a solid to make a new part but which are not dependent on mechanical properties of the part, wherein $x_1$, $y_1$, $z_1$ represent three-dimensional position for the tooling surface and φ indicates force direction at that three-dimensional position;
using the at least one processor, reconfiguring and machining the solid based on the calculated new coordinates ($x_1$, $y_1$, $z_1$,φ) for the tooling surface, to make the new part;
inspecting the part to determine whether a target curved surface is obtained; and
if the target curved surface is not obtained, iterating the above steps.

2. The method of claim 1 wherein the discretizing comprises selecting a cell size based on the variation of the local geometry of the part, and applying a first coefficient indicative of a maximum distance value to be springback compensated and a second coefficient indicative of curve displacement.

3. The method of claim 1 wherein iterating includes determining primary and secondary coefficients in the inspected part.

4. The method of claim 1 wherein the iterating comprises using coefficients based on data sources of conformed parts.

5. The method of claim 1 including providing springback compensation on curved surfaces using finite element analysis to minimize cost, reduce residual stresses and deformations in riveted structures of an aircraft.

6. The method of claim 1 including using approach equations with constants adjustable for curves depending on geometry of the part and type of forming used for machining.

7. The method of claim 1 wherein machining comprises stretch forming and the new positions comprise stretch forming data.

8. The method of claim 7 further including processing the part at room temperature or heating the part for alloyed parts.

9. The method of claim 1 wherein the part is curved and the method performs springback compensation only within the curves of the part.

10. The method of claim 1 wherein the at least one processor defines a mesh for the tooling surface point-to-point, wherein the processor uses a mesh size that varies based on curvature of the tooling surface.

11. The method of claim 1 wherein φ comprises an angle parallel to the tooling surface and indicates the direction of force in main deformation.

12. The method of claim 1 wherein the at least one processor compensates by applying compensation in the direction of main deformation based on a sinusoidal function, and applying compensation perpendicular to the direction of main deformation using a linear function.

13. A system for manufacturing a part while compensating for springback comprising:
   a processing system including at least one processor that discretizes a tooling surface using a finite element analysis to determine initial coordinates ($x_0$, $y_0$, $z_0$), where $x_0$, $y_0$, $z_0$ represent initial three-dimensional position, compensates for springback by calculating new coordinates ($x_1$, $y_1$, $z_1$,$\varphi$), wherein $x_1$, $y_1$, $z_1$ represents three-dimensional position for the tooling surface and $\varphi$ indicates force direction at that three-dimensional position, for the tooling surface point-to-point using interpolation equations that depend on the type of machining to be used to reconfigure and machine a solid to make a new springback-compensated part but are not dependent on mechanical properties of the part, and reconfigures a solid based on calculated new positions; and
   a machine that uses said type of machining and data relating to the new coordinates to make the new springback-compensated part;
   the processing system accepting parameters relating to the new part to determine whether a target curved surface is obtained, and if the target curved surface is not obtained, iterating discretizing a tooling surface using a finite element analysis, calculating new positions point-to-point using interpolation equations, and reconfiguring a solid based on calculated new positions.

14. The system of claim 13 wherein the processing system is configured to discretize by using a cell size based on the variation of the local geometry of the part, and applying a first coefficient indicative of a maximum distance value to be springback compensated and a second coefficient indicative of curve displacement.

15. The system of claim 13 wherein the processing system iterating includes determining primary and secondary coefficients in the inspected part.

16. The system of claim 13 wherein the processing system iterating comprises using coefficients based on data sources of conformed parts.

17. The system of claim 13 wherein the processing system is configured to provide springback compensation on curved surfaces using finite element analysis to minimize cost, reduce residual stresses and deformations in riveted structures of an aircraft.

18. The system of claim 13 wherein the processing system is further configured to use approach equations with constants adjustable for curves depending on geometry of the part and type of forming used for machining.

19. The system of claim 13 wherein the machine comprises a stretch forming machine and the new positions comprise stretch forming data.

20. The system of claim 19 wherein the machine manufactures the part at room temperature or heats the part for alloyed parts.

21. The system of claim 13 wherein the processing system calculates convergence of data dependent on mesh size and angle, wherein the mesh size is variable in the same part, depending on the complexity of the geometry.

22. The system of claim 13 wherein the processing system calculates new coordinates to compensate for springback based on only 4 variables (x, y, z, $\varphi$).

23. The system of claim 13 wherein the part is curved and the processing system performs springback compensation only within the curves of the part.

24. A method of manufacturing a part and compensating for springback, comprising:
   using at least one processor, discretizing a tooling surface using a finite element analysis to determine initial coordinates ($x_0$, $y_0$, $z_0$), wherein $x_0$, $y_0$, $z_0$ represent initial three-dimensional position;
   using the at least one processor, calculating new coordinates ($x_1$, $y_1$, $z_1$, $\varphi$) wherein $x_1$, $y_1$, $z_1$ represents three-dimensional position for the tooling surface and $\varphi$ indicates force direction at that three-dimensional position, for the tooling surface point-to-point using interpolation equations that depend on the type of machining to be used to reconfigure and machine a solid to make a new part, to compensate for springback;
   using the at least one processor and said type of machining, reconfiguring and machining the solid based on the calculated new coordinates ($x_1$, $y_1$, $z_1$, $\varphi$) for the tooling surface, to make the new part while compensating for springback;
   inspecting the part to determine whether a target curved surface is obtained; and
   if the target curved surface is not obtained, iterating the above steps.

* * * * *